United States Patent [19]

Metzner

[11] 4,001,966
[45] Jan. 11, 1977

[54] GROWING TRAY STRUCTURE, AS FOR MUSHROOMS

[76] Inventor: Rudolf Paul Metzner, 6234 N. Irwindale Ave., Azusa, Calif. 91702

[22] Filed: Oct. 3, 1973

[21] Appl. No.: 403,237

[52] U.S. Cl. .................... 47/1.1; 206/511; 211/126; 220/23.2; 34/238
[51] Int. Cl.² ............... A01G 1/04; B65D 21/02
[58] Field of Search ........... 206/511, 512, 513; 47/1.1, 18, 17, 34; 211/126, 128; 220/23.2, 23.4, 23.6, 23.8; 34/238

[56] References Cited

UNITED STATES PATENTS

| | | | |
|---|---|---|---|
| 663,921 | 12/1900 | McMullen | 220/23.2 |
| 2,320,388 | 6/1943 | Shaw | 211/126 |
| 2,732,967 | 1/1956 | Metcalf | 206/511 |
| 2,916,293 | 12/1959 | Lang | 206/513 |
| 3,118,249 | 1/1964 | Bard | 206/511 |
| 3,474,929 | 10/1969 | Harker | 220/63 R |
| 3,842,534 | 10/1974 | Walters | 47/1.1 |
| 3,849,932 | 11/1974 | Adams | 220/23.4 |

*Primary Examiner*—George E. Lowrance
*Attorney, Agent, or Firm*—Nilsson, Robbins, Dalgarn & Berliner

[57] ABSTRACT

A container for a growing media, e.g. compost, is disclosed as for use in the production of mushrooms. A plurality of individual container sections with the upper end open, having a depth generally in excess of 20 inches and a width under 16 inches, are affixed together in critically spaced-apart relationship to hold quantities of media. A peripheral, confining wall is provided above the container sections for supporting a common layer defining a continuous bed surface. As disclosed, the structure is fabricated of steel-wire mesh affixed to a frame of beam and column supports, and is lined, as with plastic film. Also as disclosed, a plurality of bed structures are affixed in stacked, spaced-apart tray configurations, for economy of space and handling.

9 Claims, 2 Drawing Figures

GROWING TRAY STRUCTURE, AS FOR MUSHROOMS

BACKGROUND AND SUMMARY OF THE INVENTION

Mushrooms are generally produced commercially from a growing media that is contained as a bed in various structures generally referred to as trays. Traditionally, the media is capable of supporting mushroom growth during a production period after which the tray must be emptied and refilled with fresh growing media to initiate another growing cycle. Of course, the production from the growing cycle is of considerable concern in view of the costs to process and refill the trays.

Considering the production in somewhat greater detail, conventionally mushrooms are produced from a growing media that is bulk composted and processed to attain a desirable formulation. The formulated media then receives mushroom spawn from which a mycelium develops. Thereafter, mushrooms grow from the bed and may be repeatedly harvested until the bed is exhausted.

Although it has been recognized that the total production of a mushroom bed is somewhat dependent upon the quantity of growing media, the thickness of beds and consquently the depths of trays traditionally have been rather limited due to the heat developed during the growing cycle. That is, as the process is exothermic, the depth of the growing bed has been limited to afford adequate radiating surface in relation to volume, so as to prevent the bed from attaining temperatures that would kill the mycelium and end production. For that reason, conventional mushroom trays have not exceeded about 15 inches in depth.

As another consideration, a common method of handling mushroom trays involves the use of forklifts. In general, the horizontal dimensions of objects which can be conveniently handled by such vehicles is somewhat limited. For example, it is usually desirable to limit the size of objects that are to be moved frequently to horizontal dimensions of less than 10 fect.

In spite of the confines and proposals that have been advanced in the past in relation to mushroom trays, a need continues to exist for a growing structure that has the characteristics of being: capable of use to accommodate increases yield periods, increased productivity per unit of surface area, conveniently movable from one location to another as by a forklift, economical to construct and maintain, and finally, convenient during the harvest of mushrooms.

In general, the present invention is directed to an improved mushroom tray reflecting the above considerations. Specifically, the present invention is directed to a growing-media container which includes a plurality of relatively-deep, relatively-narrow, open-top component members that are affixed together in spaced-apart relationship. The container component members are fixed together and lined with film material for containing growing media as a series of aligned spaced-apart vertical wafers. Additionally, a common space is defined above the component members by a peripheral wall so as to provide an unobstructed bed surface from whch mushrooms are harvested. Consequently, the bed is contained in a form to effectively radiate heat yet may be of a volume to support an extended period of mushroom production as well as increasing the productivity per unit of surface area.

BRIEF DESCRIPTION OF THE DRAWING

In the drawing, which constitutes a part of this specification, exemplary embodiments demonstrating various objectives and features hereof are set forth, specifically.

DESCRIPTION OF THE ILLUSTRATIVE EMBODIMENT

As required, a detailed illustrative embodiment of the invention is disclosed herein. The embodiment exemplifies the invention which may, of course, be embodied in other forms, some of which may be radically different from the illustrative embodiment. However, the specific structural and functional details disclosed herein are representative and are directed to a form currently deemed to be the best mode for the purpose hereof; and they provide a basis for the claims herein which define the scope of the invention.

Figure 1:
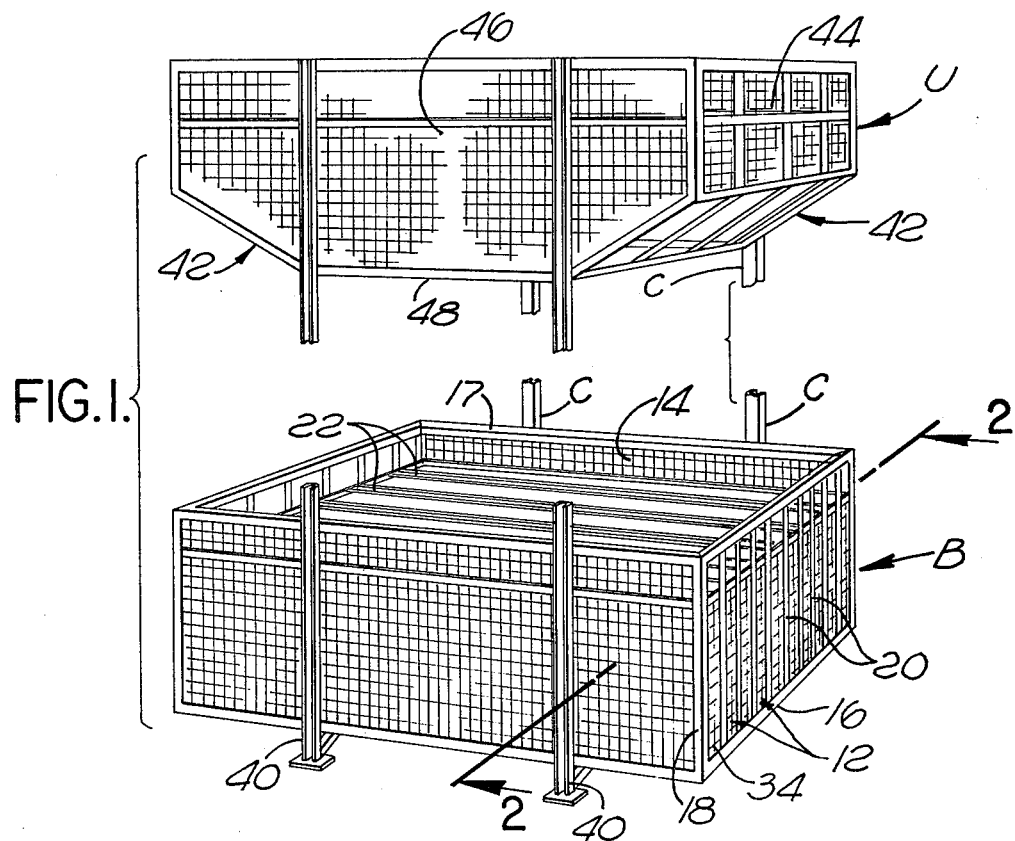
FIG. 1 is a perspective view (eliminating redundant components) of a composite mushroom-growing structure constructed in accordance with the present invention.

Referring initially to FIG. 1, there is shown a composite tray structure comprising a plurality of individual bed structures with redundant members eliminated. Specifically, a bottom bed structure B is aligned with a plurality of upper bed structures U, a single one of which is illustrated. The bed structures U and B are held in spaced-apart stacked alignment by vertical columns C which are affixed at the sides of the structures. Thus, a plurality of beds are supported substantially in vertical alignment with the result that growing space is effectively utilized and beds are accessible for harvest. Furthermore, as described in detail below, each of the bed structures is capable of supporting a substantial quantity of growing media, in relation to conventional trays, to afford a prolonged prouction period without substantial risk of developing a bed-sterilizing temperature level.

Considering the bed structure B in somewhat greater detail, a plurality of spaced-apart container sections 12 (FIG. 2) are framed by iron lengths, e.g. angle and strap, affixed together with walls of steel-wire mesh that are lined with film. In general, the linear steel stock defines the container configuration of the bed structures B and U with the containing walls being further defined by a steel-wire mesh that supports the film.

Considering the tray structure in somewhat greater detail, the external configuration of the bottom bed structure B is a parallelepiped, being horizontally somewhat rectangular. In one successful embodiment, the depth (horizontal height) of the bed structure B is approximately 30 inches, the width (depicted in FIG. 2) being approximately 5 feet and the length being approximately 7 feet.

In addition to the defined container sections 12 (FIG. 2) the bottom bed structure B also includes an upper peripheral extension wall 14 (FIG. 1) that is integral with the exterior vertical walls of the structure B. Specifically, a lower rectangular frame 16 traverses the bottom edges of the structure. Corner posts 18 extend from the corners of the frame 16 to a similar top frame 17. Thus, the external parallelepiped frame of the bed structure B is formed by the frames 16 and 17 joined by upright posts 18. End straps 20 are attached to extend between the end lengths of the frames 16 and 17 to afford additional strength and rigidity as well as to support internal beams for framing the individual container sections 12. Specifically, pairs of the straps 20 (one at each end of the tray structure B) are joined by elongated, horizontal beams 22 (FIG. 2) which define the openings to the container sections 12. At the bottom of the bed structure B, lower beams 24 extend in parallel alignment with the beams 22.

Recognizing that the components employed in the framework, as well as the total structure may vary widely, in one successful embodiment, the frames 16 and 17, the corner posts 18 and the beams 22 and 24 comprise angular steel stock while the straps 20 comprise flat steel or strap stock. In general, as indicated above, each of the container sections 12 (FIG. 2) as well as a common space 26 (above the container sections 12) is closed at support surfaces by steel wire mesh.

Considering the specific container section 12 (at the left of FIG. 2) as representative of each of the other container sections, a bottom 28 is formed of steel-wire mesh is affixed to fill the elongated rectangular space existing between the two lower beams 24 and the end members of the frame 16. Extending perpendicularly to ghe bottom 28 are side panels 30 and 32 of steel-wire mesh which are affixed respectively between a lower beam 24 and an upper beam 22. Additionally, end panels 34 (FIG. 1) extend between pairs of the straps 20 to close the ends of the container sections 12. It may, therefore, be seen that the support walls of the individual container sections 12 are defined by mesh which is rigidly supported by the frame to in turn support film. Above the openings to the container sections 12 (FIG. 2) at the perphery of the tray structure B the external panels 30 include an extending section 36 to define the wall 14 and the space 26 (FIG. 2) above the coplanar openings into the individual container sections 12.

The bottom bed structure B as described above, is affixed to opposed pairs of columns C (FIG. 1) which extend below the frame 16 to provide leg members 40 that support the bottom tray structure B above the ground. Consequently, the under side of the structure B is accessible to receive the forks of a lift truck.

The columns C (FIG. 1) extend upwardly from the bottom bed structure B and are affixed to the upper bed structures U so as to provide an integral stack. The upper bed structures U differ from the bottom bed structure B only in that tapered end-bottom walls 42 are provided to improve access to the bed contained immediately below. That is, the construction of the upper bed structure U is similar to that of the bottom bed structure B with the exception that the overall configuration of the upper bed structure U is modified from a parallelepiped configuration. Specifically, end walls 44 and side walls 46 define an upper rectangular space (not shown) which confines the upper surface of the bed. However, the bottom 48 of the tray structure U (which is parallel with the frame 17 of the lower tray and the bed surface) is confined within the four columns C. Extending laterally from the bottom 48, the side walls 46 are tapered upwardly with the result that the end walls 44 are of a lesser depth than the depth of the central portion of the side walls 46. As a consequence, tapered side-bottom walls 42 are defined at an angular offset in relation to the bottom 48 to afford improved access to the bed contained in the next-lower tray structure, e.g. bed structure B.

As indicated above, the frames for individual bed structures may be fabricated of standard linear stock, as by simple welding techniques. The columns C may comprise lengths of channel stock, welded to the bed structures. Additionally, the walls of steel-wire mesh may be tack welded to the linear stock framework to complete the basic tray structure.

Figure 2:
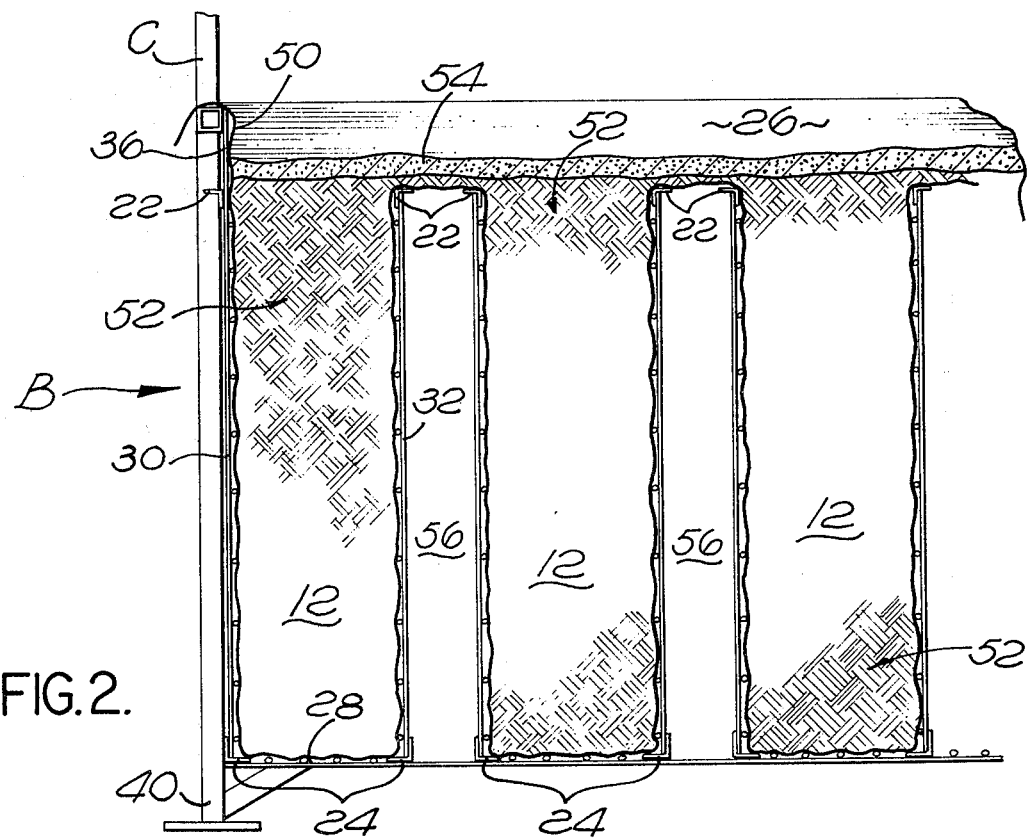
FIG. 2 is a fragmentary vertical sectional view taken along line 2—2 of FIG. 1.

After assembly of the metal portion of the embodiment disclosed herein, the next step involves the placement of film linings 50 (FIG. 2) to close all of the supporting walls. Specifically, as illustrated in FIG. 2, linings 50 are placed over all the surfaces defined by the steel-wire mesh, closing the sides and bottom of each of the container sections 12 along with the sides of the space 26.

Generally, any of a wide variety of plastic film materials may be successfully employed as, for example, sheet polyethylene of a sufficient thickness to hold the growing media. Obviously, the linings 50 may comprise individual bag sections or simply sheets of media laid in position to close the open structres of the mesh as explained above. In some instances it may be helpful to use adhesive tape to hold the linings 50 in position until they receive growing media. Considering the spaces that are to receive growing media, it has been found to be somewhat critical to provide the sections 12 of a width (FIG. 2) between about 6 and 16 inches. The depth (FIG. 2) of the sections 12 should be at least twenty inches while the length (FIG. 2) should be determined with regard for convenience of handling. Although the number of sections 12 to a bed structure, e.g. bed structure B is subject to wide variations, practical considerations generally place the number from three to six. Spacing between the sections 12 is somewhat dependent on growing temperatures; however, in using somewhat conventional techniques spaces of between 3 and 6 inches have been found practical.

After placement of the linings 50, the tray is ready for use. Of course, different growing techniques may be employed; however, according to one technique, spawn media 52 (FIG. 2) in the form of compost, in which mushroom spawn or mycelium has been run, is placed in the container sections 12 so that these sections are filled just above the openings thereto. Thereafter, a casing media 54 is placed to form the upper surface of the bed as is generally conventional practice in the commercial production of mushrooms. The entire growing structure may then be placed in the environments to produce mushrooms.

It is to be emphasized that the growing period resulting from the use of an apparatus in accordance with the present invention is relatively prolonged. Specifically, in view of the substantially increased depth of the spawn media 52 (providing increased volume) in the bed structures, an extended growing period is provided by each of the beds. However, open passages 56 (FIG. 2) provided between parallel wafers of the growing media (held in the film-lined sections 12) permit air circulation and heat radiation which avoids excessive temperatures within the growing media. Consequently, cconomy is improved by increased production per unit of surface, per unit of time and a longer growing period after preparatory operations which are substantially conventional. Additionally, as illustrated the disclosed embodiment can be conveniently moved (as by forklift) and affords convenient access to the unobstructed beds for harvesting.

At the conclusion of a production period, the structure of the preferred embodiment would normally be removed from the growing environment and emptied with the removal of the media 52 and 54 along with the linings 50. Subsequently, fresh linings would normally be placed in the structure and the process preparatory to the growing of mushrooms would be repeated.

In that regard, it is to be noted that the tray structures of the present invention also involve further economies. Specifically, less casing soil (media 54) per ton of compost (media 52) is required, than in conventional trays. In similar comparisons, watering costs and picking costs normally are also reduced due to more compact spaces and higher productivity.

Generally, the advantages of the present invention stem from the spaced-apart lobes, or container sections 12 which are far deeper than conventional, are of narrow width to permit cooling, yet are integrated to provide a common bed surface. It should be appreciated that such a structure could be variously accomplished and in that regard, the bed might define any of a variety of surfacial forms other than a plane. For example, the bed surface may define a cylinder with the lobes extending radially inward and terminating at a hollow core through which cooling air flows. Generally, such a growing or tray structure would be revolved for access, and accordingly a retainer would be required for holding medias against gravitational forces.

It is also noteworthy that the structure of the tray may involve alternate materials. Recognizing that as presently analyzed, the best structure is disclosed, plastic sheet or mesh, or sheet metal or other materials may well be determined to be effective. Also, handling sections may well be affixed, e.g., a channel to receive the arms of a forklift. Thus, various other specific forms may involve the apparatus of the present invention and as a consequence, the scope hereof is deemed to be as set forth in the following claims.

What is claimed is:

1. A bed structure to receive growing medium, as for use in the production of mushrooms or the like, comprising:

a plurality of walled container sections for holding said growing medium, each having one side defining a substantial opening for receiving said medium for containment, said sections extending away from said opening to a distance of at least 20 inches;

means for affixing said walled container sections together in vertically spaced-apart relationship with said openings horizontally disposed whereby to permit air flow around individual of said container sections; and means defining a common space above the openings of said walled container sections for containing a quantity of said casing media whereby mushrooms may be grown in a continuous horizontal bed, supported by spaced-apart quantities of said growing medium in said container sections.

2. A growing structure including a plurality of bed structrues according to claim 1 affixed together in horizontally spaced-apart, stacked relationship.

3. A growing structure according to claim 2 wherein at least one of said bed structures includes walled containers, the bottoms of which are tapered to afford access to the bed of the next lower tray structure.

4. A bed structure according to claim 1 wherein said walled container sections comprise walls of rigid lattice defining openings, and plastic film linings for said walls.

5. A bed structure according to claim 1 wherein said walled container sections comprise open rigid walls defining substantial open spaces, and film linings for closing said open spaces.

6. A bed structure according to claim 5 wherein said open rigid walls comprise steel.

7. A bed structure according to claim 1 wherein said open rigid walls comprise steel wire mesh and define said sections to be of a width between about 6 and 16 inches.

8. A bed structure including a plurality of tray structures in accordance with claim 1 and further including a plurality of vertical column members affixed to support said tray structures in stacked spaced-apart relationship.

9. A bed structure according to claim 8 wherein said walled container sections comprise open rigid walls defining substantial open spaces, and film linings for closing said open spaces and wherein said open rigid walls comprise steel wire mesh.

* * * * *